United States Patent
Hung et al.

(10) Patent No.: US 9,572,177 B2
(45) Date of Patent: Feb. 14, 2017

(54) CONTROL CIRCUIT OF WIRELESS USER EQUIPMENT FOR DYNAMICALLY REPLACING RRC MESSAGES

(71) Applicant: Realtek Semiconductor Corp., Hsinchu (TW)

(72) Inventors: Han-Sheng Hung, New Taipei (TW); Chen Chen, New Taipei (TW); Chi-Ming Cheng, Taipei (TW); Chao-Yuan Hsu, Taipei (TW); Ting-Yu Wei, Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/079,927

(22) Filed: Mar. 24, 2016

(65) Prior Publication Data

US 2016/0302222 A1     Oct. 13, 2016

(30) Foreign Application Priority Data

Apr. 10, 2015 (TW) .............................. 104111710 A (51) Int. Cl.
| H04M 11/04 | (2006.01) |
| H04W 72/00 | (2009.01) |
| H04W 68/00 | (2009.01) |
| H04W 72/12 | (2009.01) |

(52) U.S. Cl.
CPC ................................ *H04W 72/1242* (2013.01)

(58) Field of Classification Search
CPC ...... H04W 76/02; H04W 66/005; H04W 4/08; H04W 6/10447

USPC ................ 455/404.1, 426.1, 452.1, 458
See application file for complete search history.

(56) References Cited

U.S. PATENT DOCUMENTS

| 2011/0235575 | A1 | 9/2011 | Tapia et al. |
| 2013/0035085 | A1 | 2/2013 | Axell et al. |
| 2013/0244679 | A1* | 9/2013 | Anbe ............... H04W 76/02 455/452.1 |
| 2013/0324142 | A1 | 12/2013 | Kanamarlapudi et al. |
| 2015/0201397 | A1* | 7/2015 | Jeong ............... H04W 68/005 455/458 |
| 2015/0271860 | A1* | 9/2015 | Baghel ............... H04W 4/08 455/426.1 |

(Continued)

*Primary Examiner* — William D Cumming
(74) *Attorney, Agent, or Firm* — Birch, Stewart, Kolasch & Birch, LLP (57) ABSTRACT

A control circuit of a wireless user equipment includes: a message generating circuit for generating a first and a second RRC (radio resource control) messages, and configuring corresponding first and second priorities; a message reordering circuit for comparing the first and second priorities. If the first priority is higher than the second priority, the message reordering circuit assigns the second RRC message in a message queue to have a transmission order after the first RRC message. Afterward, when the message generating circuit generates a third RRC message, the message generating circuit configures a third priority for the third RRC message. The message reordering circuit compares the first through the third priorities to rearrange transmission orders of RRC messages, and if the third priority is equal to the second priority, the message reordering circuit replaces the second RRC message in the message queue with the third RRC message.

8 Claims, 4 Drawing Sheets

(56) References Cited

U.S. PATENT DOCUMENTS

2016/0080920 A1* 3/2016 Baghel ................ H04L 67/1044
455/404.1

* cited by examiner

CONTROL CIRCUIT OF WIRELESS USER EQUIPMENT FOR DYNAMICALLY REPLACING RRC MESSAGES

CROSS-REFERENCE TO RELATED APPLICATIONS

This application claims the benefit of priority to Patent Application No. 104111710, filed in Taiwan on Apr. 10, 2015; the entirety of which is incorporated herein by reference for all purposes.

BACKGROUND

The disclosure generally relates to a mobile communication system and, more particularly, to a control circuit for dynamically replacing the messages to be transmitted from a wireless user equipment to a communication station.

In the conventional mobile communication system, a wireless UE (user equipment) detects the signal channel quality to determine whether to transmit a measurement report to the network side to thereby request the network side to assign radio resources. The aforementioned signal channel quality may be measured based on the retry ratio, the received signal strength indicator (RSSI), the reference signal received power (RSRP), the reference signal received quality (RSRQ), the packet error rate (PER), the bit error rate (BER), or other parameters.

The signal channel quality may vary as the wireless UE moves or signal environment changes, and thus the wireless UE frequently transmits many measurement reports to the network side. However, the network side needs to take time in handling the measurement report transmitted from the wireless UE, and the wireless UE may be moved to other place when the network side handles the received previous measurement report. Therefore, the configuration of the radio resource assigned to the wireless UE by the network side is often not the most suitable configuration for the current environment of the wireless UE. As a result, it may easily cause problems, such as connection lost or call drop, to the wireless UE.

SUMMARY

An example embodiment of a control circuit of a wireless UE for controlling the wireless UE to conduct wireless communication with a communication station is disclosed, comprising: a message generating circuit, arranged to operably generate a first RRC message and a second RRC message to be transmitted to the communication station through a wireless communication circuit of the wireless UE, to operably configure a first message identification and a first priority corresponding to the first RRC message, and to operably configure a second message identification and a second priority corresponding to the second RRC message; and a message reordering circuit, coupled with the message generating circuit, arranged to operably compare the first priority with the second priority, wherein if the first priority is higher than the second priority, the message reordering circuit configures a transmission order of the second RRC message in a message queue to be lower than that of the first RRC message; wherein when the message generating circuit afterward generates a third RRC message to be transmitted to the communication station through the wireless communication circuit, the message generating circuit configures a third message identification and a third priority corresponding to the third RRC message; wherein the message reordering circuit compares the first priority, the second priority, and the third priority to rearrange transmission orders of RRC messages in the message queue, and if the third priority is equal to the second priority, the message reordering circuit replaces the second RRC message in the message queue with the third RRC message.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
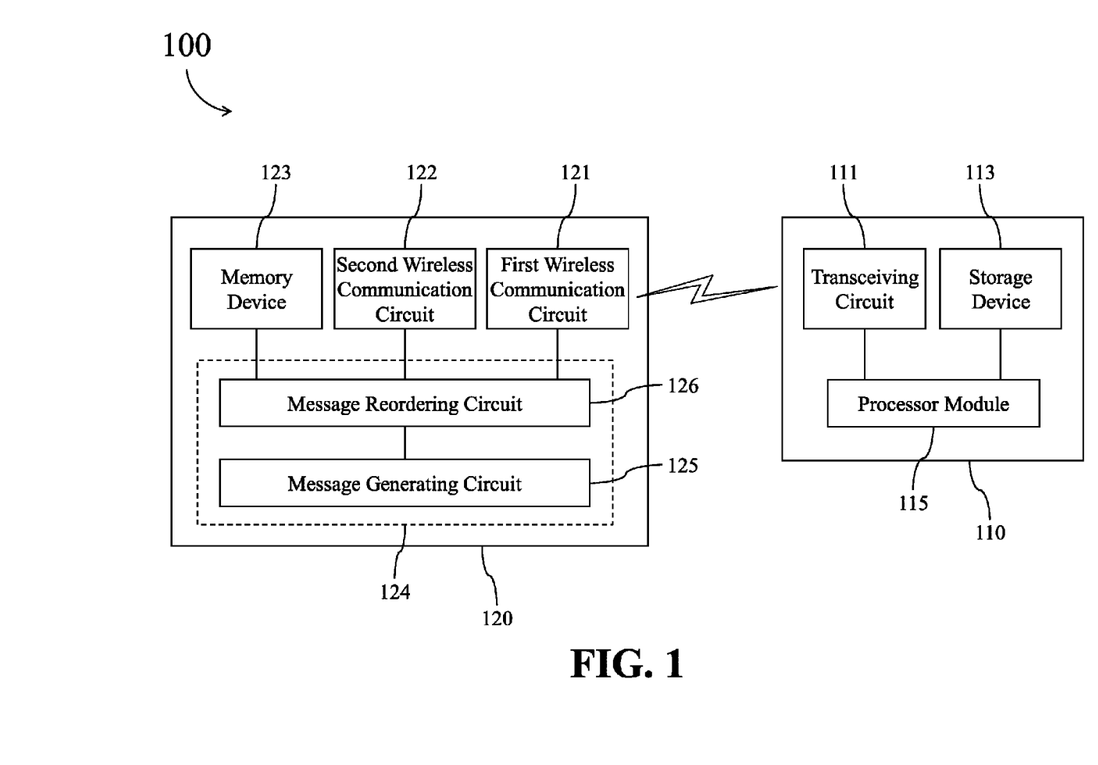
FIG. 1 shows a simplified functional block diagram of a mobile communication system according to one embodiment of the present disclosure.

FIG. 1 shows a simplified functional block diagram of a mobile communication system 100 according to one embodiment of the present disclosure. The mobile communication system 100 comprises multiple communication stations and multiple wireless user equipments (UEs). For the purpose of explanatory convenience in the following description, FIG. 1 only shows an example communication station 110 and an example wireless UE 120. As shown in FIG. 1, the communication station 110 comprises a transceiving circuit 111, a storage device 113, and a processor module 115. The wireless UE 120 comprises a first wireless communication circuit 121, a second wireless communication circuit 122, a memory device 123, and a control circuit 124. The control circuit 124 comprises a message generating circuit 125 and a message reordering circuit 126. Other communication stations and wireless UEs in the mobile communication system 100 have similar structure as the aforementioned communication station 110 and wireless UE 120.

In the communication station 110, the transceiving circuit 111 is configured to operably transmit signals by adopting a first radio access technology (RAT). The storage device 113 is configured to operably store required data for the operations of the communication station 110. The processor module 115 is coupled with the transceiving circuit 111 and the storage device 113, and configured to operably control the operations of the transceiving circuit 111 and the storage device 113.

In the wireless UE 120, the first wireless communication circuit 121 is configured to operably communicate with the transceiving circuit 111 of the communication station 110 by adopting the first RAT. The second wireless communication circuit 122 is configured to operably communicate with one or more access points (APs, not shown in FIG. 1) by adopting a second RAT different from the first RAT. The memory device 123 is configured to operably store the data received by the first wireless communication circuit 121 and the second wireless communication circuit 122, and to operably store the message queues to be transmitted to the communication station 110. The control circuit 124 is coupled with the first wireless communication circuit 121, the second wireless communication circuit 122, and the memory device 123. The control circuit 124 is configured to operably control the operations of the first wireless communication circuit 121, the second wireless communication circuit 122, and the memory device 123.

In practice, each of the transceiving circuit 111 and the first wireless communication circuit 121 may comprise one or more antennas, one or more modulators/demodulators, one or more analog signal processing circuits, and/or one or more digital processing circuits for communicating with other devices by utilizing the first RAT. The second wireless communication circuit 122 may comprise one or more antennas, one or more modulators/demodulators, one or more analog signal processing circuits, and/or one or more digital processing circuits for communicating with other devices by utilizing the second RAT. Each of the storage device 113 and the memory device 123 may be realized with one or more volatile/non-volatile memory circuits, such as registers, hard drives, or flash memory devices. Each of the processor module 115 and the control circuit 124 may be realized with one or more microprocessors, one or more network processors, one or more digital signal processing circuits, and/or other suitable processing circuits.

In other words, the message generating circuit 125 and the message reordering circuit 126 of the control circuit 124 may be realized with different circuit components, or may be integrated into a single circuit chip.

For the purpose of explanatory convenience, other components of the mobile communication system 100 and their connection relationships are not shown in FIG. 1.

As can be appreciated from the foregoing descriptions, the wireless UE 120 is capable of communicating with the communication station 110 adopting the first RAT while communicating with an available access point adopting the second RAT. In practice, the first RAT may refer to one or more wireless wide area network (WWAN) technologies, wireless metropolitan area network (WMAN) technologies, or other suitable wire communication technologies with a wider communication range, such as WiMAX, GSM, UMTS, HSPA, LTE, LTE-Advanced and other 3GPP RATs. The second RAT may refer to one or more wireless local area network (WLAN) technologies, or other suitable wire communication technologies with a shorter communication range (compared with the first RAT), such as IEEE 802.11 series RATs.

For the illustrative purpose, it is assumed hereinafter that the first RAT is referred to at least one of the 3GPP RATs. Thus, the communication station 110 may be realized with a 3GPP base station (BS), such as a Node B or an Evolved Node B (eNodeB or eNB). In addition, the communication station 110 and one or more access points may be co-located in substantially the same location.

In operations, the control circuit 124 of the wireless UE 120 may generate many radio resource control messages (RRC messages) of various types from time to time, and store these RRC messages in the message queue of the memory device 123. These RRC messages may be transmitted to the communication station 110 when the wireless UE 120 has appropriate transmission opportunities.

The conventional wireless UE typically configures the transmission order of the RRC messages in the message queue using a FIFO (first in, first out) approach.

In order to render the configuration of the radio resource assigned to the wireless US 120 by the mobile communication system 100 to be more suitable for the current environment of the wireless UE 120, the control circuit 124 dynamically rearranges the transmission orders of the RRC messages in the message queue of the memory device 123, instead of using the traditional FIFO approach. The operations of dynamically rearranging the transmission orders of the RRC messages in the message queue performed by the control circuit 124 will be further described in the following by reference to FIG. 2.

Figure 2:
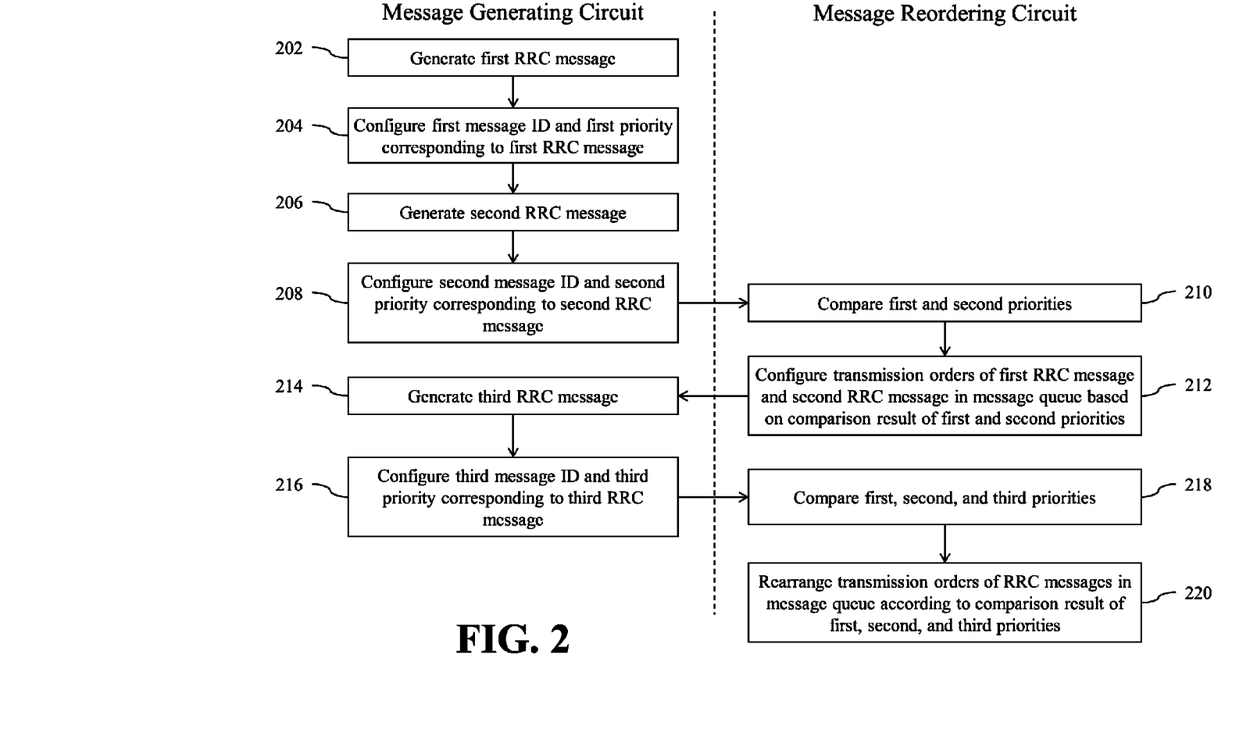
FIG. 2 shows a simplified flowchart of a method for dynamically rearranging transmission orders of RRC messages according to one embodiment of the present disclosure.

FIG. 2 shows a simplified flowchart of a method for dynamically rearranging transmission orders of RRC messages according to one embodiment of the present disclosure. In FIG. 2, operations within a column under the name of a specific device are operations to be performed by the specific device. For example, operations within a column under the label "Message Generating Circuit" are operations to be performed by the message generating circuit 125, operations within a column under the label "Message Reordering Circuit" are operations to be performed by the message reordering circuit 126.

In the operation 202, the message generating circuit 125 of the control circuit 124 generates a first RRC message MSG_A in response to the change of signal channel quality or in response to the instruction of a communication station (e.g., the communication station 110 or other one) in the mobile communication system 100. The message generating circuit 125 stores the first RRC message MSG_A in the message queue of the memory device 123.

Then, the message generating circuit 125 performs the operation 204 to configure a first message identification MID_A and a first priority PRI_A corresponding to the first RRC message MSG_A.

Afterward, when change of signal channel quality is detected by the message generating circuit 125, or an instruction generated by a communication station (e.g., the communication station 110 or other one) is received by the message generating circuit 125, the message generating circuit 125 performs the operation 206 to generate a second RRC message MSG_B. The message generating circuit 125 stores the second RRC message MSG_B in the message queue of the memory device 123.

In the operation 208, the message generating circuit 125 configures a second message identification MID_B and a second priority PRI_B corresponding to the second RRC message MSG_B.

The message reordering circuit 126 performs the operations 210 and 212 before utilizing the first wireless communication circuit 121 to transmit the second RRC message MSG_B generated by the message generating circuit 125 to the communication station 110 which is located within the current signal transmission range of the wireless UE 120.

In the operation 210, the message reordering circuit 126 compares the first priority PRI_A and the second priority PRI_B.

In the operation 212, the message reordering circuit 126 configures the transmission orders of the first RRC message MSG_A and the second RRC message MSG_B in the message queue of the memory device 123 according to the comparison result of the first priority PRI_A and the second priority PRI_B.

Afterward, when change of signal channel quality is again detected by the message generating circuit 125, or another instruction generated by a communication station (e.g., the communication station 110 or other one) is received by the message generating circuit 125, the message generating circuit 125 performs the operation 214 to generate a third RRC message MSG_C. The message generating circuit 125 then stores the third RRC message MSG_C in the message queue of the memory device 123.

In the operation 216, the message generating circuit 125 configures a third message identification MID_C and a third priority PRI_C corresponding to the third RRC message MSG_C.

The message reordering circuit 126 performs the operations 218 and 220 before utilizing the first wireless communication circuit 121 to transmit the third RRC message MSG_C to the communication station 110 which is located within the current signal transmission range of the wireless UE 120.

In the operation 218, the message reordering circuit 126 compares the first priority PRI_A, the second priority PRI_B, and the third priority PRI_C.

In the operation 220, the message reordering circuit 126 rearranges (i.e., reconfigures) the transmission orders of the RRC messages in the message queue of the memory device 123 according to the comparison result of the first priority PRI_A, the second priority PRI_B, and the third priority PRI_C, so as to enable the first wireless communication circuit 121 to transmit a RRC message with higher priority to the communication station 110 more earlier.

After the RRC message transmitted from the first wireless communication circuit 121 is received by the transceiving circuit 111 of the communication station 110, the processor module 115 of the communication station 110 determines the current signal environment of the wireless UE 120 based on the received RRC message, and then assigns a suitable radio resource configuration to the wireless UE 120 through the first wireless communication circuit 121.

In general, the RRC messages can be divided into three types: RRC connection reconfiguration complete message, measurement report messages containing a measurement report, and other RRC messages in addition to the RRC connection reconfiguration complete message and the measurement report message.

In the above operations 204, 208, and 216, the message generating circuit 125 may configure a corresponding specific message identification for a specific RRC message (e.g., the aforementioned first RRC message MSG_A, second RRC message MSG_B, or third RRC message MSG_C) based on the type of the specific RRC message.

For example, if the specific RRC message is not a measurement report message, then the message generating circuit 125 may configure the corresponding specific message identification to be a predetermined value, such as 0. On the contrary, if the specific RRC message is a measurement report message, then the message generating circuit 125 may configure the specific message identification to be other values different from the above predetermined value according to the type of measure report contained in the measurement report message. In this situation, if the specific RRC message is a RRC connection reconfiguration complete message, or a RRC message other than the RRC connection reconfiguration complete message and the measurement report messages, the message generating circuit 125 would configure the corresponding specific message identification to be 0.

On the contrary, if the specific RRC message is a measurement report message, the message generating circuit 125 would configure the specific message identification to be other values different from 0. In practice, the measure report contained in the measurement report message may be an event trigger report or a periodical report. The aforementioned event trigger report may be one of the type A1-A6 reports or one of the type B1-B2 reports. The aforementioned periodical report may be an intra-frequency measurement report, an inter-frequency measurement report, or an inter-RAT measurement report. In one embodiment, the message generating circuit 125 may configure the specific message identification to be other values different from 0, such as a number selected from 1 through 32 according to the type of measure report contained in the specific RRC message, so that different types of the measurement report messages respectively correspond to different message identifications.

As a result, the message reordering circuit 126 is enabled to promptly determine whether a specific RRC message is a measurement report message or not based on its message identification in later operations. When the specific RRC message is the measurement report message, the message reordering circuit 126 is also enabled to promptly recognize the type of the measurement report contained in the specific RRC message based on the message identification of the specific RRC message.

Additionally, in the aforementioned operations 204, 208, and 216, the message generating circuit 125 may configure a corresponding specific priority for the specific RRC message based on the type of the specific RRC message. For example, if the specific RRC message is a RRC connection reconfiguration complete message, the message generating circuit 125 may configure the specific priority to the highest priority level. If the specific RRC message is one of the various measurement report messages, the message generating circuit 125 may configure the specific priority to a middle priority level lower than the aforementioned highest priority level. If the specific RRC message is a RRC message other than the RRC connection reconfiguration complete message and the measurement report messages, the message generating circuit 125 may configure the specific priority to the lower priority level lower than the aforementioned middle priority level.

In practice, the message generating circuit 125 may configure the measurement report messages of different types to have a same predetermined priority.

Alternatively, the message generating circuit 125 may configure different priorities to different kinds of measurement report messages. For example, the message generating circuit 125 may respectively assign different priorities to the measurement report messages of different types.

For another example, the message generating circuit 125 may divide various measurement report messages into different groups. In this situation, the message generating circuit 125 may configure different types of measurement report messages in the same group to have the same priority, while configure different priorities to different groups. For example, the message generating circuit 125 may configure various measurement report messages containing the event trigger report to have a first predetermined priority, and configure various measurement report messages containing the periodical report to have a different second predetermined priority. In one embodiment, the message generating circuit 125 configures the first predetermined priority to have a higher priority level than the second predetermined priority.

As can be appreciated from the foregoing descriptions, if the first RRC message MSG_A is a RRC connection reconfiguration complete message, the third RRC message MSG_C is a measurement report message, and the second RRC message MSG_B is not a RRC connection reconfiguration complete message nor a measurement report message, then the message generating circuit 125 may configure the aforementioned first priority PRI_A to be higher than both the second priority PRI_B and the third priority PRI_C, while configure the third priority PRI_C to be lower than the first priority PRI_A but higher than the second priority PRI_B.

In another embodiment, if the first RRC message MSG_A is a RRC connection reconfiguration complete message, the third RRC message MSG_C is a first measurement report message containing an event trigger report, and the second RRC message MSG_B is a second measurement report message containing a periodical report, the message generating circuit 125 may configure the first priority PRI_A to be higher than both the second priority PRI_B and the third priority PRI_C, while configure the third priority PRI_C to be lower than the first priority PRI_A but higher than the second priority PRI_B.

In yet another embodiment, if the first RRC message MSG_A is a RRC connection reconfiguration complete message, the third RRC message MSG_C is a third measurement report message containing a periodical report, and the second RRC message MSG_B is a fourth measurement report message containing an event trigger report, the message generating circuit 125 may configure the first priority PRI_A to be higher than both the second priority PRI_B and the third priority PRI_C, while configure the third priority PRI_C to be lower than the first priority PRI_A but higher than the second priority PRI_B.

Figure 3:
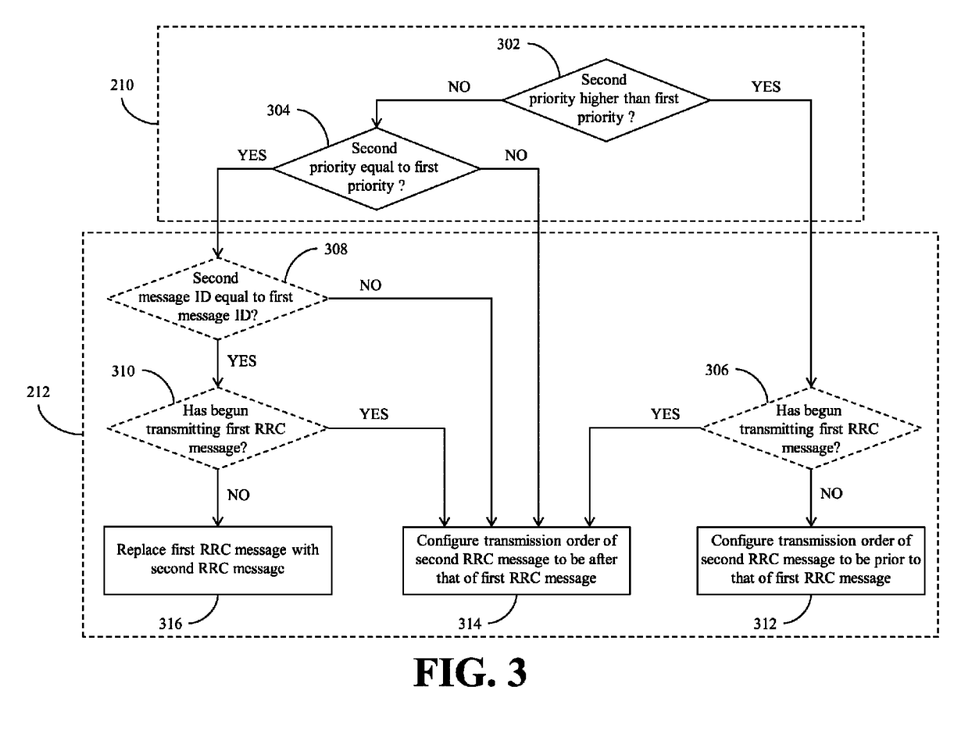
FIGS. 3-4 show simplified flowchart of partial operations in FIG. 2 according to one embodiments of the present disclosure.

Please refer to FIG. 3, which shows a simplified flowchart illustrating the operations 210 and 212 in FIG. 2 according to one embodiment of the present disclosure. The operations 210 and 212 performed by the message reordering circuit 126 will be further described in the following by reference to FIG. 3.

As shown in FIG. 3, the message reordering circuit 126 compares the first priority PRI_A and the second priority PRI_B in the operation 210 to determine whether the second priority PRI_B has a higher priority level.

For example, the message reordering circuit 126 may perform the operation 302 to determine whether the second priority PRI_B is higher than the first priority PRI_A. If the second priority PRI_B is not higher than the first priority PRI_A, then the message reordering circuit 126 performs the operation 304. On the contrary, if the second priority PRI_B is higher than the first priority PRI_A, the message reordering circuit 126 performs the operation 306.

In the operation 304, the message reordering circuit 126 determines whether the second priority PRI_B is equal to the first priority PRI_A. If the second priority PRI_B is equal to the first priority PRI_A, the message reordering circuit 126 performs the operation 308. On the contrary, if the second priority PRI_B is not equal to the first priority PRI_A, it means that the second priority PRI_B is lower than the first priority PRI_A, and thus the message reordering circuit 126 then performs the operation 314.

In the operation 306, the message reordering circuit 126 determines whether the first wireless communication circuit 121 has begun transmitting the first RRC message MSG_A. If the first wireless communication circuit 121 does not yet transmit the first RRC message MSG_A, the message reordering circuit 126 performs the operation 312. On the contrary, if the first wireless communication circuit 121 has begun transmitting the entire first RRC message MSG_A or a part of that, the message reordering circuit 126 performs the operation 314.

In the operation 308, the message reordering circuit 126 determines whether the second message identification MID_B is equal to the first message identification MID_A. If the second message identification MID_B is equal to the first message identification MID_A, it means that the second RRC message MSG_B and the first RRC message MSG_A are of the same type and the second RRC message MSG_B is a newer version of the first RRC message MSG_A, and thus the second RRC message MSG_B is more suitable for reflecting the current signal environment of the wireless UE 120 than the first RRC message MSG_A. In this situation, the message reordering circuit 126 performs the operation 310.

On the contrary, if the second message identification MID_B is not equal to the first message identification MID_A, it means that the second RRC message MSG_B and the first RRC message MSG_A are different types of RRC messages. In this situation, the message reordering circuit 126 performs the operation 314.

In the operation 310, the message reordering circuit 126 determines whether the first wireless communication circuit 121 has begun transmitting the first RRC message MSG_A. If the first wireless communication circuit 121 does not yet transmit the first RRC message MSG_A, the message reordering circuit 126 performs the operation 316. On the contrary, if the first wireless communication circuit 121 has begun transmitting the entire first RRC message MSG_A or a part of that, the message reordering circuit 126 performs the operation 314.

In the operation 312, the message reordering circuit 126 configures the transmission order of the second RRC message MSG_B in the message queue of the memory device 123 to be prior to the transmission order of the first RRC message MSG_A, so that the first wireless communication circuit 121 would transmit the second RRC message MSG_B with higher priority to the communication station 110 earlier.

In the operation 314, the message reordering circuit 126 configures the transmission order of the second RRC message MSG_B in the message queue of the memory device 123 to be after the transmission order of the first RRC message MSG_A, so that the first wireless communication circuit 121 would transmit the first RRC message MSG_A with higher priority to the communication station 110 earlier.

In the operation 316, the message reordering circuit 126 replaces the first RRC message MSG_A in the message queue of the memory device 123 with the second RRC message MSG_B to prevent the first wireless communication circuit 121 from transmitting the stale first RRC message MSG_A to the communication station 110. Accordingly, the time required for transmitting stale RRC messages to the communication station 110 can be effectively omitted.

Figure 4:
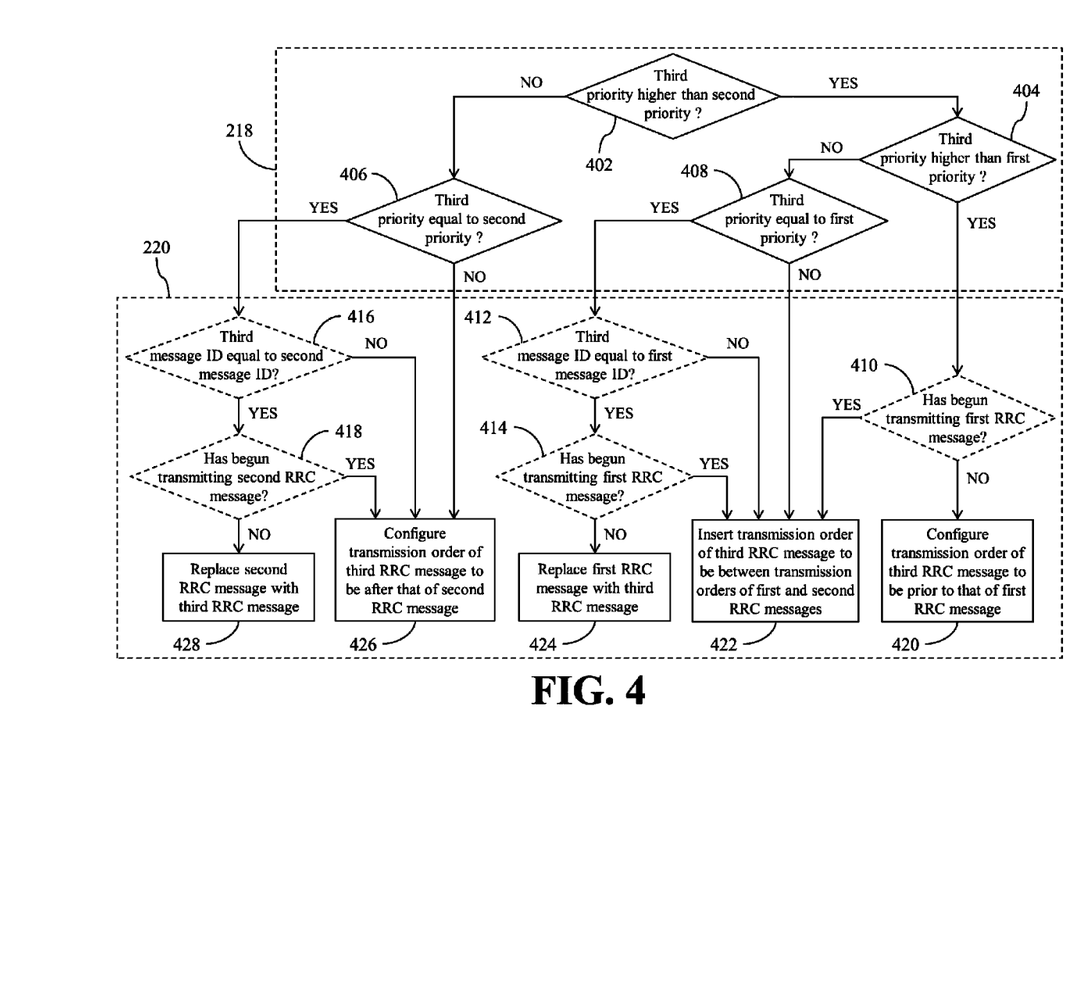

Please refer to FIG. 4, which shows a simplified flowchart illustrating the operations 218 and 220 in FIG. 2 according to one embodiment of the present disclosure. The operations 218 and 220 performed by the message reordering circuit 126 will be further described in the following by reference to FIG. 4.

For the purpose of explanatory convenience, it is assumed hereinafter that the operations of FIG. 4 are performed under the situation where the last step of the operation 212 is the operation 314 in FIG. 3. In other words, it is assumed in the embodiment of FIG. 4 that the message reordering circuit 126 configured the transmission order of the second RRC message MSG_B in the message queue of the memory device 123 to be after the transmission order of the first RRC message MSG_A.

As shown in FIG. 4, the message reordering circuit 126 may perform the operation 402 in the operation 218 to determine whether the third priority PRI_C is higher than the second priority PRI_B. If the third priority PRI_C is higher than the second priority PRI_B, the message reordering circuit 126 performs the operation 404. On the contrary, if the third priority PRI_C is not higher than the second priority PRI_B, the message reordering circuit 126 performs the operation 406.

In the operation 404, the message reordering circuit 126 determines whether the third priority PRI_C is higher than the first priority PRI_A. If the third priority PRI_C is higher than the first priority PRI_A, the message reordering circuit 126 performs the operation 410. On the contrary, if the third priority PRI_C is not higher than the first priority PRI_A, the message reordering circuit 126 performs the operation 408.

In the operation 406, the message reordering circuit 126 determines whether the third priority PRI_C is equal to the second priority PRI_B. If the third priority PRI_C is equal to the second priority PRI_B, the message reordering circuit 126 performs the operation 416. On the contrary, if the third priority PRI_C is not equal to the second priority PRI_B, it means that the third priority PRI_C is lower than the second priority PRI_B, and thus the message reordering circuit 126 performs the operation 426.

In the operation 408, the message reordering circuit 126 determines whether the third priority PRI_C is equal to the first priority PRI_A. If the third priority PRI_C is equal to the first priority PRI_A, the message reordering circuit 126 performs the operation 412. On the contrary, if the third priority PRI_C is not equal to the first priority PRI_A, it means that the third priority PRI_C is lower than the first priority PRI_A, and thus the message reordering circuit 126 performs the operation 422.

In the operation 410, the message reordering circuit 126 determines whether the first wireless communication circuit 121 has begun transmitting the first RRC message MSG_A. If the first wireless communication circuit 121 does not yet transmit the first RRC message MSG_A, the message reordering circuit 126 performs the operation 420. On the contrary, if the first wireless communication circuit 121 has begun transmitting the entire first RRC message MSG_A or a part of that, the message reordering circuit 126 performs the operation 422.

In the operation 412, the message reordering circuit 126 determines whether the third message identification MID_C is equal to the first message identification MID_A. If the third message identification MID_C is equal to the first message identification MID_A, it means that the third RRC message MSG_C and the first RRC message MSG_A are of the same type and the third RRC message MSG_C is a newer version of the first RRC message MSG_A, and thus the third RRC message MSG_C is more suitable for reflecting the current signal environment of the wireless UE 120 than the first RRC message MSG_A. In this situation, the message reordering circuit 126 performs the operation 414.

On the contrary, if the third message identification MID_C is not equal to the first message identification MID_A, it means that the third RRC message MSG_C and the first RRC message MSG_A are different types of RRC message. In this situation, the message reordering circuit 126 performs the operation 422.

In the operation 414, the message reordering circuit 126 determines whether the first wireless communication circuit 121 has begun transmitting the first RRC message MSG_A. If the first wireless communication circuit 121 does not yet transmit the first RRC message MSG_A, the message reordering circuit 126 performs the operation 424. On the contrary, if the first wireless communication circuit 121 has begun transmitting the entire first RRC message MSG_A or a part of that, the message reordering circuit 126 performs the operation 422.

In the operation 416, the message reordering circuit 126 determines whether the third message identification MID_C is equal to the second message identification MID_B. If the third message identification MID_C is equal to the second message identification MID_B, it means that the third RRC message MSG_C and the second RRC message MSG_B are of the same type and the third RRC message MSG_C is a newer version of the second RRC message MSG_B, and thus the third RRC message MSG_C is more suitable for reflecting the current signal environment of the wireless UE 120 than the second RRC message MSG_B. In this situation, the message reordering circuit 126 performs the operation 418.

On the contrary, if the third message identification MID_C is not equal to the second message identification MID_B, it means that the third RRC message MSG_C and the second RRC message MSG_B are different types of RRC message. In this situation, the message reordering circuit 126 performs the operation 426.

In the operation 418, the message reordering circuit 126 determines whether the first wireless communication circuit 121 has begun transmitting the second RRC message MSG_B. If the first wireless communication circuit 121 does not yet transmit the second RRC message MSG_B, the message reordering circuit 126 performs the operation 428. On the contrary, if the first wireless communication circuit 121 has begun transmitting the entire second RRC message MSG_B or a part of that, the message reordering circuit 126 performs the operation 426.

In the operation 420, the message reordering circuit 126 configures the transmission order of the third RRC message MSG_C in the message queue of the memory device 123 to be prior to the transmission order of the first RRC message MSG_A, so that the first wireless communication circuit 121 would transmit the third RRC message MSG_C with higher priority to the communication station 110 earlier.

In the operation 422, the message reordering circuit 126 inserts the transmission order of the third RRC message MSG_C in the message queue of the memory device 123 to be between the transmission orders of the first RRC message MSG_A and the second RRC message MSG_B.

In the operation 424, the message reordering circuit 126 replaces the first RRC message MSG_A in the message queue of the memory device 123 with the third RRC message MSG_C to prevent the first wireless communication circuit 121 from transmitting the stale first RRC message MSG_A to the communication station 110. Accordingly, the time required for transmitting the stale RRC messages to the communication station 110 can be effectively omitted.

In the operation 426, the message reordering circuit 126 configures the transmission order of the third RRC message MSG_C in the message queue of the memory device 123 to be after the transmission order of the second RRC message MSG_B, so that the first wireless communication circuit 121 would transmit the first RRC message MSG_A and the second RRC message MSG_B with higher priorities to the communication station 110 earlier.

In the operation 428, the message reordering circuit 126 replaces the second RRC message MSG_B in the message queue of the memory device 123 with the third RRC message MSG_C to prevent the first wireless communication circuit 121 from transmitting the stale second RRC message MSG_B to the communication station 110, thereby effectively omitting the time required for transmitting the stale RRC messages to the communication station 110.

It can be appreciated from the foregoing elaborations that the message reordering circuit 126 of the control circuit 124 dynamically rearranges the transmission orders of the RRC messages in the message queue of the memory device 123, instead of using the traditional FIFO approach. The aforementioned dynamical configurations of transmission orders of the RRC messages ensure that the RRC messages with higher priority (such as the RRC connection reconfiguration complete message) can be transmitted to the communication station 110 earlier than other RRC messages, so as to enable the communication station 110 to receive more important RRC messages as earlier as possible.

In addition, the aforementioned dynamical configurations of transmission orders of the RRC messages can also prevent the stale or invalid RRC messages from being transmitted to the communication station 110, so as to expedite the transmission of newer or more updated RRC messages to the communication station 110. As a result, the communication station 110 is enabled to make response to the current signal channel environment of the wireless UE 120 more quickly, so that more suitable configuration of radio resources can be subsequently assigned to the wireless UE 120.

By adopting the aforementioned dynamical configurations of transmission orders of the RRC messages, the wireless UE 120 can effectively avoid or eliminate the connection lost or call drop problems.

Please note that the execution order of the operations in FIG. 3 is merely an exemplary embodiment, rather than a restriction to the practical implementations. For example, the operations 302 and 304 may be swapped or may be performed simultaneously.

In addition, at least one of the operations 308 and 310 may be omitted in some embodiments.

For example, in some embodiments where the operation 308 is omitted, the message reordering circuit 126 may jump to the operation 310 after determine that the second priority PRI_B is equal to the first priority PRI_A in the operation 304.

In some embodiments where the operation 310 is omitted, the message reordering circuit 126 may jump to the operation 316 after determine that the second message identification MID_B is equal to the first message identification MID_A in the operation 308.

In some embodiments where the operations 308 and 310 are both omitted, the message reordering circuit 126 may jump to the operation 316 after determine that the second priority PRI_B is equal to the first priority PRI_A in the operation 304.

Similarly, the execution order of the operations in FIG. 4 is merely an exemplary embodiment, rather than a restriction to the practical implementations. For example, the operations 402 and 404 may be swapped or may be performed simultaneously.

In addition, at least one of the operations 412, 414, 416, and 418 may be omitted in some embodiments.

For example, in some embodiments where the operation 412 is omitted, the message reordering circuit 126 may jump to the operation 414 after determine that the third priority PRI_C is equal to the first priority PRI_A in the operation 408.

In some embodiments where the operation 414 is omitted, the message reordering circuit 126 may jump to the operation 424 after determine that the third message identification MID_C is equal to the first message identification MID_A in the operation 412.

In some embodiments where the operations 412 and 414 are both omitted, the message reordering circuit 126 may jump to the operation 424 after determine that the third priority PRI_C is equal to the first priority PRI_A in the operation 408.

In some embodiments where the operation 416 is omitted, the message reordering circuit 126 may jump to the operation 418 after determine that the third priority PRI_C is equal to the second priority PRI_B in the operation 406.

In some embodiments where the operation 418 is omitted, the message reordering circuit 126 may jump to the operation 428 after determine that the third message identification MID_C is equal to the second message identification MID_B in the operation 416.

In some embodiments where the operations 416 and 418 are both omitted, the message reordering circuit 126 may jump to the operation 428 after determine that the third priority PRI_C is equal to the second priority PRI_B in the operation 406.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The tem "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit (124) of a wireless UE (120) for controlling the wireless UE (120) to conduct wireless communication with a communication station (110), the control circuit (124) comprising:

a message generating circuit (125), arranged to operably generate a first RRC message (MSG_A) and a second RRC message (MSG_B) to be transmitted to the communication station (110) through a wireless communication circuit (121) of the wireless UE (120), to operably configure a first message identification (MID_A) and a first priority (PRI_A) corresponding to the first RRC message (MSG_A), and to operably configure a second message identification (MID_B) and a second priority (PRI_B) corresponding to the second RRC message (MSG_B); and a message reordering circuit (126), coupled with the message generating circuit (125), arranged to operably compare the first priority (PRI_A) with the second priority (PRI_B), wherein if the first priority (PRI_A) is higher than the second priority (PRI_B), the message reordering circuit (126) configures a transmission order of the second RRC message (MSG_B) in a message queue to be after that of the first RRC message (MSG_A);

wherein when the message generating circuit (125) afterward generates a third RRC message (MSG_C) to be transmitted to the communication station (110) through the wireless communication circuit (121), the message generating circuit (125) configures a third message identification (MID_C) and a third priority (PRI_C) corresponding to the third RRC message (MSG_C);

wherein the message reordering circuit (126) compares the first priority (PRI_A), the second priority (PRI_B), and the third priority (PRI_C) to rearrange transmission orders of RRC messages in the message queue, and if the third priority (PRI_C) is equal to the second priority (PRI_B), the message reordering circuit (126) replaces the second RRC message (MSG_B) in the message queue with the third RRC message (MSG_C).

2. The control circuit (124) of claim 1, wherein the message reordering circuit (126) replaces the second RRC message (MSG_B) in the message queue with the third RRC message (MSG_C) only if the third priority (PRI_C) is equal to the second priority (PRI_B) and the third message identification (MID_C) is also equal to the second message identification (MID_B).

3. The control circuit (124) of claim 2, wherein the message reordering circuit (126) replaces the second RRC message (MSG_B) in the message queue with the third RRC message (MSG_C) only if the third priority (PRI_C) is equal to the second priority (PRI_B) and the wireless communication circuit (121) does not yet transmit the second RRC message (MSG_B).

4. The control circuit (124) of claim 2, wherein the message reordering circuit (126) replaces the second RRC message (MSG_B) in the message queue with the third RRC message (MSG_C) only if the third priority (PRI_C) is equal to the second priority (PRI_B), the third message identification (MID_C) is also equal to the second message identification (MID_B), and the wireless communication circuit (121) does not yet transmit the second RRC message (MSG_B).

5. The control circuit (124) of claim 1, wherein the message generating circuit (125) is further arranged to operably configures the first to the third message identifications (MID_A, MID_B, MID_C) and the first to the third priorities (PRI_A, PRI_B, PRI_C) based on types of the first to the third RRC messages (MSG_A, MSG_B, MSG_C);

wherein if the first RRC message (MSG_A) is a RRC connection reconfiguration complete message but the second RRC message (MSG_B) is not a RRC connection reconfiguration complete message, then the message generating circuit (125) configures the first priority (PRI_A) to be higher than the second priority (PRI_B).

6. The control circuit (124) of claim 5, wherein if the third RRC message (MSG_C) is a measurement report message but the second RRC message (MSG_B) is not a measurement report message, then the message generating circuit (125) configures the third priority (PRI_C) to be lower than the first priority (PRI_A) and higher than the second priority (PRI_B).

7. The control circuit (124) of claim 5, wherein if the third RRC message (MSG_C) is a first measurement report message containing an event trigger report while the second RRC message (MSG_B) is a second measurement report message containing a periodical report, then the message generating circuit (125) configures the third priority (PRI_C) to be lower than the first priority (PRI_A) and higher than the second priority (PRI_B).

8. The control circuit (124) of claim 5, wherein if the third RRC message (MSG_C) is a third measurement report message containing a periodical report while the second RRC message (MSG_B) is a fourth measurement report message containing an event trigger report, then the message generating circuit (125) configures the third priority (PRI_C) to be lower than the first priority (PRI_A) and higher than the second priority (PRI_B).

* * * * *